(12) United States Patent
Mendez

(10) Patent No.: US 6,266,225 B1
(45) Date of Patent: Jul. 24, 2001

(54) METHOD OF PROGRAMMING RELAY BASED CONNECTORS

(75) Inventor: Victor Mendez, Kokomo, IN (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/432,379

(22) Filed: Nov. 1, 1999

(51) Int. Cl.$^7$ .................................................... H01H 9/00
(52) U.S. Cl. ..................... 361/160; 361/166; 361/170; 361/191
(58) Field of Search ................................ 361/160, 166, 361/168.1, 169.1, 170, 187, 189, 190–191; 701/1, 22, 36, 49; 307/10.1

(56) References Cited

U.S. PATENT DOCUMENTS

| | | | |
|---|---|---|---|
| 4,481,585 | * 11/1984 | Huntzinger et al. | 701/36 |
| 4,578,591 | * 3/1986 | Floyd et al. | 307/10.1 |
| 6,102,364 | * 8/2000 | Busato | 251/129.05 |

* cited by examiner

Primary Examiner—Michael J. Sherry
(74) Attorney, Agent, or Firm—Jimmy L. Funke

(57) ABSTRACT

A method of programming one or more relay based electrical devices comprises the steps of selecting an electrical device to program, switching the relay from a first state to a second state, and applying a time varying signal to the relay associated with the selected device. The method also includes the steps of counting signal transitions occurring during the switching of the relay, and comparing the counted signal transitions to a predetermined value. The method further includes the step of programming the device based on the comparison step. Accordingly, the programming methodology advantageously enables programming of the device by employing the switching time period of the relay which allows for elimination of a separate dedicated programming terminal.

19 Claims, 3 Drawing Sheets

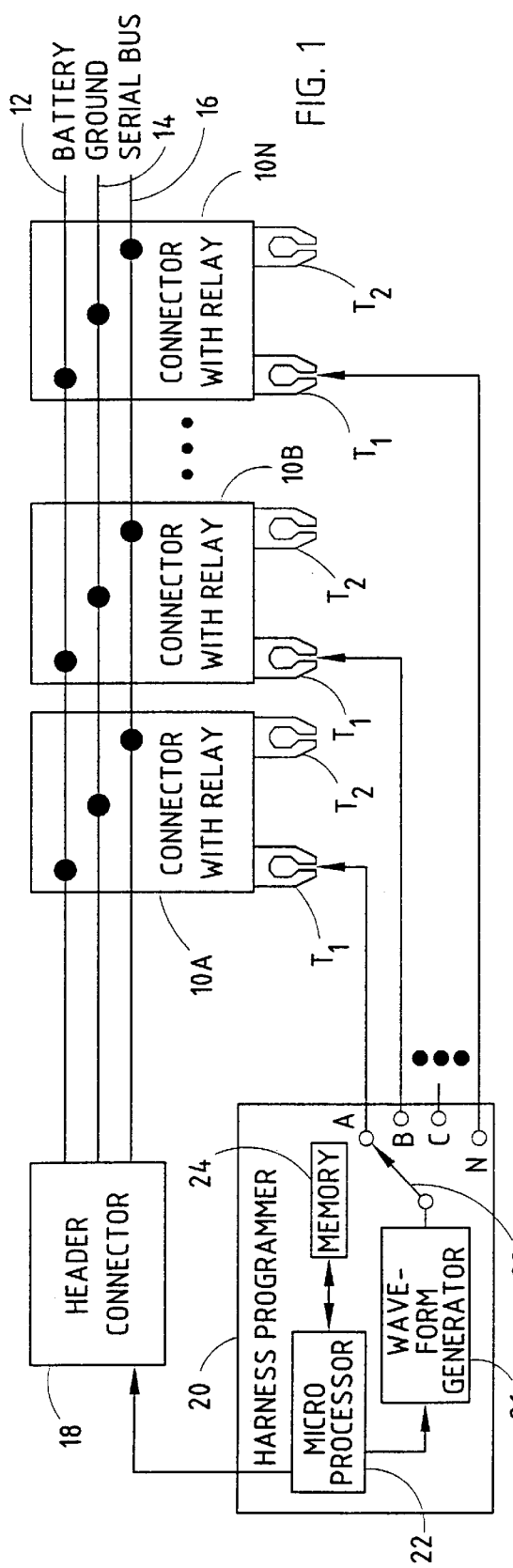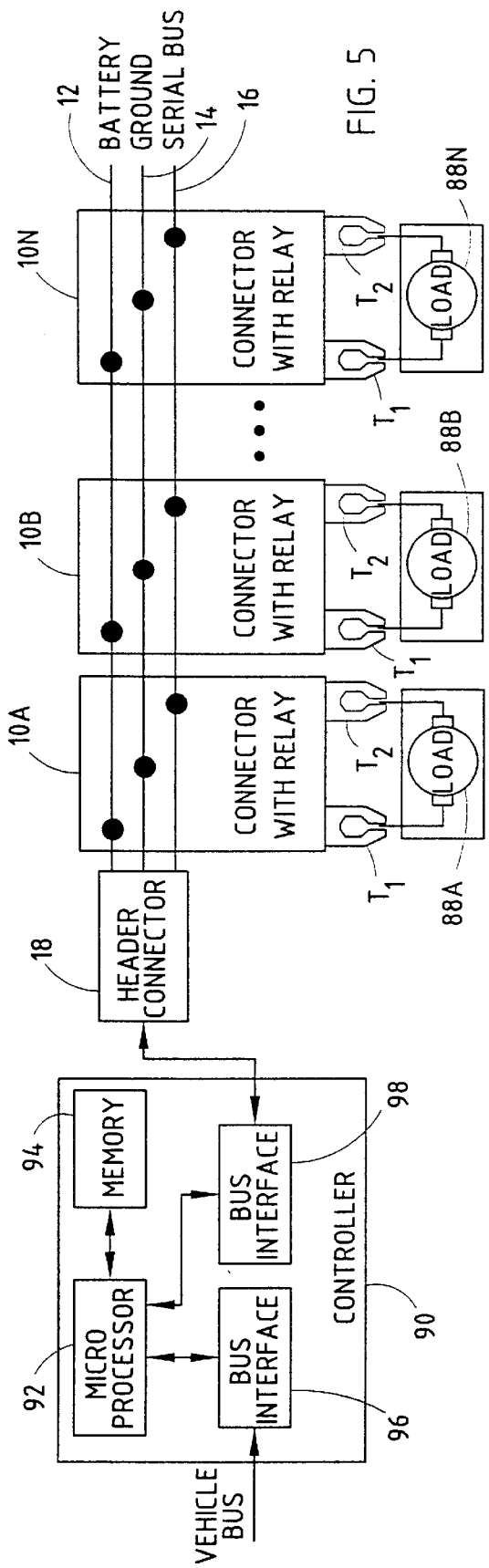

METHOD OF PROGRAMMING RELAY BASED CONNECTORS

TECHNICAL FIELD

The present invention generally relates to relay based electrical devices and, more particularly, to a method of programming relay based devices, such as electrical connectors for use in automotive vehicles.

BACKGROUND OF THE INVENTION

Automotive vehicles commonly employ a series of electrical connectors for connecting power to various high current electrical devices, such as headlamps, solenoids, motors, and other electrically operated devices. High current electrical connectors, such as those drawing 5 amps or greater, typically employ a relay that turns on and off the electrical device connected thereto in response to control signals. Each electrical connector generally has limited signal processing capability so that it may perform a designated switching operation pursuant to the externally generated control signal. Relay based electrical connectors are widely known and are commonly used in automotive vehicles.

Conventional electrical connectors generally employ a pair of load terminals, e.g., contact pins, for electrically connecting the connector to a designated load device. One of the terminals provides a feed forward current path, while the other terminal provides a feed back current path. In addition, conventional relay based electrical connectors typically employ a third terminal, which is a dedicated programming terminal, that enables the electrical connector to be programmed during or following the manufacture of the connector. Examples of programmed data typically include address, function, and calibration information. The programming operation is generally performed at the manufacturing site where a header, a series of wires, and a series of the connectors to be programmed are connected together. The dedicated programming terminal of each electrical connector is generally connected to a programming rig that provides a signal to the connector to initiate the programming of that particular connector. Once the programming operation is complete, the dedicated programming terminal generally is no longer employed, and thereafter remains unused.

As a consequence, the aforementioned conventional relay based connectors require three separate electrical terminals, including the dedicated programming terminal which is generally not employed during the operation of the device. The dedicated programming terminal adds to the overall cost, size, and complexity of the connector. As a result, it is therefore desirably to provide for a programmable relay based connector that employs a minimal number of electrical terminals.

SUMMARY OF THE INVENTION

In accordance of the teachings of the present invention, a method of programming one or more relay based electrical devices, such as electrical connectors, is provided. The method comprises the steps of selecting an electrical device to program, switching the relay associated with the selected electrical device from a first state to a second state, and applying a time varying signal to the relay associated with the selected device. The method also includes the steps of counting signal transitions occurring during the switching of the relay, and comparing the counted signal transitions to a predetermined value. The method further includes the step of programming the device based on the comparison step. Accordingly, the programming methodology advantageously enables programming of the device by utilizing the relay switching which allows for elimination of a separate dedicated programming terminal.

These, and additional objects, advantages, features and benefits of the present invention will become apparent from the following specification.

BRIEF DESCRIPTION OF THE DRAWINGS

The present invention will now be described, by way of example, with reference to the accompanying drawings, in which:

FIG. 1 is a block diagram illustrating the programming of a plurality of relay based electrical connectors according to the present invention;

FIG. 5 is a block diagram illustrating use of programmed relay based electrical connectors in a vehicle.

DESCRIPTION OF THE PREFERRED EMBODIMENT

Figure 2:
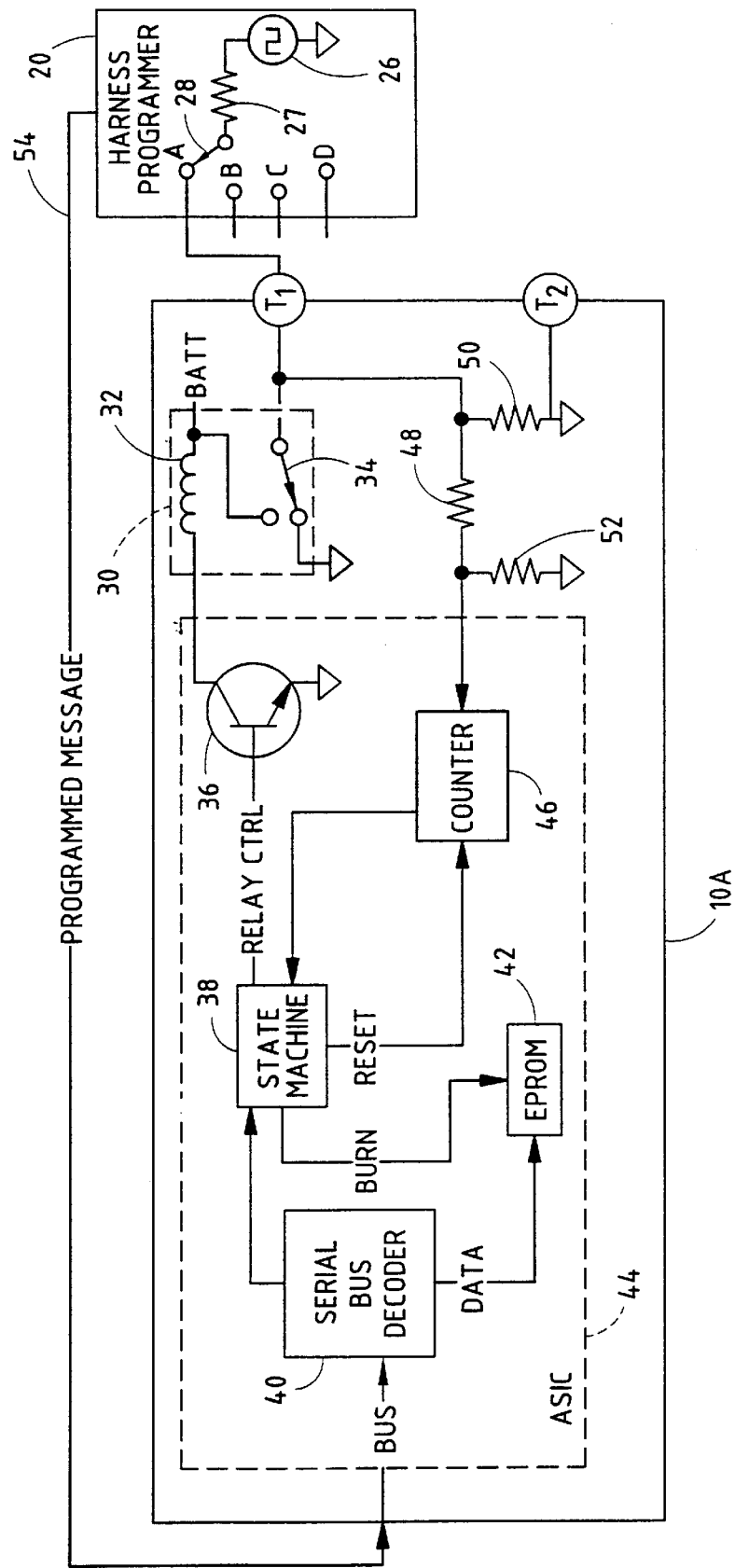
FIG. 2 is a block circuit diagram further illustrating the programming of one relay based connector.

Referring to FIG. 1, a plurality of electrical connectors 10A–10N are shown interconnected to each other via three wires which provide for a battery line 12, a ground line 14, and a serial data bus line 16. Electrical connectors 10A–10N may be electrically coupled to each of lines 12, 14, and 16 via conventional insulation displacement connections. The series of interconnected connectors may include any number of connectors. Each of electrical connectors 10A–10N has a relay for energizing or de-energizing a load device that may be connected thereto. Load devices may include headlamps, motors, and various other electrically operated devices. Each of the connectors 10A–10N further includes a pair of electrical terminals $T_1$ and $T_2$, such as male or female receptacles, which provide for the interfaced connection to the corresponding load device. One of the terminals $T_1$ and $T_2$ provides a feed forward current path, while the other of terminals $T_1$ and $T_2$ provides a feed back current path to complete the circuit path.

In addition, the series of interconnected electrical connectors 10A–10N are coupled to a header connector 18. The header connector 18 provides an interface that serves to allow for connection to external devices. During the programming operation, the header connector 18 is connected to a harness programmer 20. Harness programmer 20 is a programming device that is used to program each of the electrical connectors 10A–10N as described herein. Harness programmer 20 preferably includes a microprocessor 22, memory 24, and a waveform generator 26. Waveform generator 26 supplies a time varying signal such as a square wave signal for example. Also included in harness programmer 20 is a switch 28 for switching amongst one of a plurality of contact positions A–N. Switch 28 selects one of the electrical connectors at a time to be programmed. Contact A is shown connected to electrical terminal $T_1$ of connector 10A, contact B is shown connected to electrical terminal $T_1$ of contact 10B, etc. The harness programmer 20 performs the programming operation, preferably at the manufacturing site, prior to installing the electrical connectors 10A–10N in a vehicle. To program the electrical connectors 10A–10N, the harness programmer 20 selects one of the electrical connectors 10A–10N at a time, and applies the time varying signal to one of terminals $T_1$ and $T_2$ of the selected electrical connector as described herein.

With particular reference to FIG. 2, one electrical connector 10A is further shown in greater detail. Electrical connector 10A is equipped with a relay 30 which generally includes a relay coil 32 and a contact switch 34 for switching between ground and battery. One end of relay coil 32 is coupled to the battery input which may provide a DC voltage potential of twelve volts, for example. The fixed end of switch 34 is connected to terminal $T_1$ which is further shown connected to the external harness programmer 20. Connector 10A also includes a voltage divider made up of resistors 48, 50, and 52, which divides the voltage applied at terminal $T_1$ to a reduced voltage potential at the input of a counter 46.

The electrical connector 10A further includes an application specific integrated circuit (ASIC) 44 which has an NPN transistor 36. Transistor 36 has a collector terminal coupled to one end of relay coil 32 opposite the battery terminal, and an emitter terminal coupled to ground. Transistor 36 also has a base connected to receive a relay control signal from a state machine 38. In addition, ASIC 44 includes a serial bus decoder 40, electrically programmable read only memory (EPROM) 42, and counter 46. Serial bus decoder 40 receives program message inputs via line 54 from harness programmer 20. Program messages may include the information to be programmed such as address, function, and calibration information. The serial bus decoder 40 decodes the information received and provides the decoded data to the electronically programmable read only memory (EPROM) 42. Counter 46 counts the number of signal pulse transitions received at its input from terminal $T_1$ and provides a count number to state machine 38. State machine 38 is programmed to carry out a method of programming the electrical connector 10A which includes counting the number of counts from counter 46 and actuating memory programming by burning the data received by decoder 40 into EPROM 42 in accordance with the programming method of the present invention.

The programming method of the present invention advantageously utilizes the switching of the relay 30 to enable programming of selected electrical connectors. By applying a time varying signal to one of the terminals, such as terminal $T_1$, during the relay switching in which the relay switch 34 moves from one state, such as ground, to a second state, such as the battery potential, counter 46 is able to count the number of signal transitions provided during the relay switching transition to detect the application of the time varying signal which indicates that the electrical connector is selected for programming.

Figure 3:
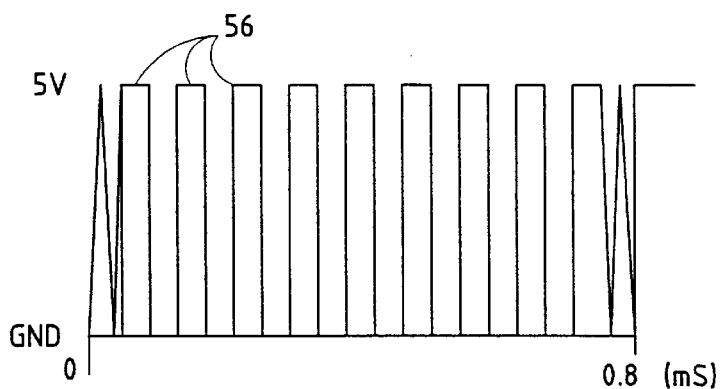
FIG. 3 illustrates signal transitions counted by a counter during relay switching from ground to battery during the programming operation.

Referring to FIG. 3, one example of the detection of the time varying signal by counter 46 is illustrated during the relay switching operation. The time varying signal provides a series of voltage pulses 56, such as the square wave signal shown, or other time varying signal. According to the example shown, the waveform generator supplies a 10 kHz square wave signal that varies between 0 and 12 volts. The 12 volts signal is converted to 5 volts via the voltage divider provided by resistors 48, 50, and 52. According to this example, a relay referred to as Model NEC ET 2-B3G1S, which is commercially available from NEC Corporation, was employed which has a switching time period of approximately 0.8 milliseconds to switch from the ground state to the battery potential state. During the switching period, the counter detects the 10 kHz signal and counts the signal pulse transitions.

Figure 4:
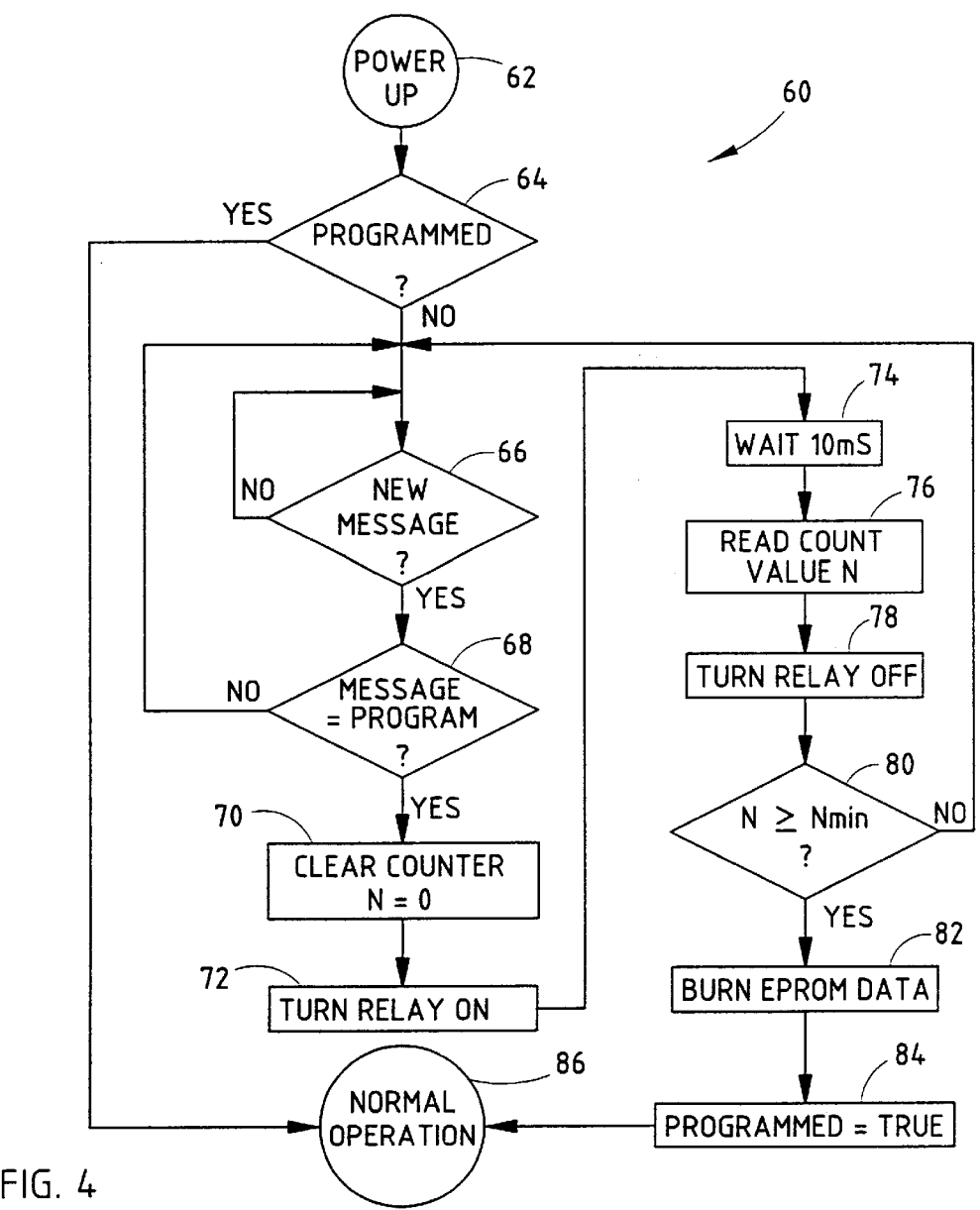
FIG. 4 is a flow diagram illustrating the methodology of programming the relay based electrical connector.

Referring to FIG. 4, a method 60 of programming one or more electrical connectors is illustrated therein in accordance with the present invention. Method 60 begins with step 62 to power up the harness programmer as well as the series of relay based electrical connectors. In decision block 64, method 60 checks to see if the selected connector is already programmed and, if so, jumps to a ready for a normal operation state 86. If the selected connector has not yet been programmed, method 60 proceeds to decision block 66 to check if a new message has been received. If a new message has not been received, method 60 continues to check for the new message. Once a new message has been received, method 60 proceeds to decision block 68 to check if the received message is a program message and, if not, returns to decision block 66 to wait for a new message.

If the received message is a program message, methodology 60 proceeds to step 70 to clear the counter by setting count value N equal to zero. Thereafter, step 72 turns the relay associated with the selected electrical connector to the "on" state. The relay is turned on by switching the collector of transistor 36 to ground which causes switch 34 to transition from the ground state to the battery potential state. The transition of switch 34 between ground and battery typically undergoes a slight delay such as 2.2 milliseconds before leaving the grounded contact, and thereafter takes approximately 0.8 millisecond to reach the battery contact. The 0.8 millisecond time period lapsing between the switching states is utilized to count signal transitions applied at terminal $T_1$. With the relay on, methodology 60 waits approximately 10 milliseconds in step 74 and then proceeds to read the count value N in step 76. Once the count value N has been read, methodology 60 proceeds to turn off the relay in step 78, and proceeds to decision block 80 to check if the count value N is greater than or equal to a minimal count value $N_{min}$. If count value N does not exceed the minimum value $N_{min}$ methodology 60 returns to decision block 66 to wait for a new message. If count value N is greater than or equal to the minimum required value $N_{min}$, methodology 60 proceeds to step 82 to enable programming by burning the data in the EPROM 42. In step 84, method 60 set a programmed flag indicative of completion of the programming operation, and then returns to the ready for normal operation state 86.

Once the electrical connectors have been programmed, the electrical connectors may be employed in a vehicle, according to one application. The programmed electrical connectors can be installed in a vehicle as shown in FIG. 5, according to one example. In FIG. 5, each of connectors 10A–10N is connected to a load device such as respective load devices 88A–88N. Load devices 88A–88N may include lights, such as vehicle headlamps, and other devices that turn on and off in response to control signals. In addition, a controller 90 is shown connected to header connector 18. Controller 90 has a microprocessor 92, memory 94, a first bus interface 96, and a second bus interface 98. The first bus interface 96 provides an interface between a vehicle data communication bus and controller 90, while the second bus interface provides an interface between controller 90 and header connector 18. The controller 90 is preferably employed to control operation of the programmed electrical connectors to turn the specific load devices 88A–88N on and off, as desired.

Accordingly, the method of programming electrical devices, such as connectors, according to the present invention advantageously provides for a reduced complexity and low cost programming technique, which eliminates the need for separate dedicated programming terminals. By employing the present programming methodology, one of the feed forward and feed back terminals used to supply current to and from a load device may also be employed to select an electrical connector to enable programming thereof in accordance with the present invention.

To those skilled in the art to which this invention appertains, the above-described preferred embodiments may be subject to change or modification. Such change or modification can be carried out without departing from the scope of the invention, which is intended to be limited only by the scope of the appended claims.

What is claimed is:

1. A method of programming one or more electrical devices each having a relay, said method comprising the steps of:

selecting an electrical device to program;

switching the relay associated with the selected device from a first state to a second state during a switching time period;

applying a time varying signal to the relay associated with the selected device;

counting signal transitions occurring during the switching time period of the relay;

comparing the counted signal transitions to a predetermined value; and programming said electrical device based on said comparison step.

2. The method as defined in claim 1, wherein said step of switching said relay includes the steps of:

turning on said relay;

turning off said relay; and counting the number of signal pulses during the time period between said steps of turning the relay on and turning the relay off.

3. The method as defined in claim 1, wherein said step of programming comprises burning data into memory in the selected electrical device.

4. The method as defined in claim 1 further comprising the steps of comparing said count value to a minimum value, and ignoring the programming step if the count value is less than the minimum value.

5. The method as defined in claim 1, wherein said electrical device comprises a relay based connector.

6. The method as defined in claim 5 further comprising the step of connecting a load device to said relay based connector so that said connector can be employed to turn the load device on and off.

7. The method as defined in claim 6 further comprising the step of assembling said electrical device in a vehicle.

8. The method as defined in claim 1 further comprising the steps of selecting another electrical device and repeating said steps of applying, switching, counting, and programming.

9. A method of programming an electrical device having a relay, said method comprising the steps of:

switching the relay associated with the electrical device from one of a grounded state and voltage potential state to the other of the grounded state and the voltage potential state;

applying a time varying signal to the relay associated with the electrical device;

counting signal transitions occurring during the switching of the relay;

comparing the counted signal transitions to a predetermined value; and programming the electrical device based on the comparison step.

10. The method as defined in claim 9, wherein said step of switching said relay includes the steps of:

turning said relay on to move a relay switch from said one state to the other state; and counting the number of signal transitions during the switching time period.

11. The method as defined in claim 9, wherein said step of programming comprises burning data into memory in the selected electrical device.

12. The method as defined in claim 9 further comprising the steps of comparing said count value to a minimum value, and ignoring the programming step if the count value is less than the minimum value.

13. The method as defined in claim 9, wherein said electrical device comprises a relay based connector.

14. The method as defined in claim 13, wherein said relay based connector is installed in a vehicle.

15. A relay based electrical device comprising: programmable memory;

a relay having a relay coil and a switch;

a first input for connecting load power to a load device; and a second input for providing a feedback signal to said load device, wherein one of said first and second inputs further serves as a programming input to program data in said programmable memory, and wherein said programming includes switching said switch from a first state to a second state, applying a time varying signal to said relay, counting signal transitions during a relay switching time period, and programming said memory based on a comparison of said signal transition count and a predetermined value.

16. The device as defined in claim 15, wherein said relay based electrical device comprises an electrical connector.

17. The device as defined in claim 16, wherein said electrical connector is installed in a vehicle.

18. The device as defined in claim 15, wherein said step of switching comprises switching said switch from ground to a voltage potential.

19. The device as defined in claim 15 further comprising a transistor for turning said relay on and off.

* * * * *